United States Patent
Wen

(10) Patent No.: US 11,203,390 B2
(45) Date of Patent: *Dec. 21, 2021

(54) SELF-BALANCING SCOOTER AND MAIN FRAME ASSEMBLY THEREOF

(71) Applicant: SHENZHEN XIANGYOU TECHNOLOGY CO., LTD., Shenzhen (CN)

(72) Inventor: Xia Wen, Hong Kong (HK)

(73) Assignee: SHENZHEN XIANGYOU TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/985,838

(22) Filed: Aug. 5, 2020

(65) Prior Publication Data
US 2020/0361558 A1    Nov. 19, 2020

Related U.S. Application Data

(63) Continuation-in-part of application No. 16/015,269, filed on Jun. 22, 2018, now Pat. No. 10,787,218, which is a continuation of application No. PCT/CN2016/096972, filed on Aug. 26, 2016.

(51) Int. Cl.
*B62K 11/00* (2006.01)
*B62K 11/02* (2006.01)
*H02G 11/00* (2006.01)

(52) U.S. Cl.
CPC ............ *B62K 11/007* (2016.11); *B62K 11/02* (2013.01); *B62K 2202/00* (2013.01); *B62K 2204/00* (2013.01); *H02G 11/00* (2013.01)

(58) Field of Classification Search
CPC ............. B62K 11/007; B62K 2202/00; A63C 2203/40; B62J 11/13; B62J 11/19; B62J 6/16; F16C 19/163; F16C 2226/72; F16C 2226/76; H02G 11/00
See application file for complete search history.

(56) References Cited

U.S. PATENT DOCUMENTS

| 790,798 | A | * | 5/1905 | Lytle | ...................... F16C 11/04 |
| | | | | | 403/116 |
| 4,076,267 | A | * | 2/1978 | Lipscomb | .......... A63C 17/0033 |
| | | | | | 280/400 |

(Continued)

*Primary Examiner* — Emma K Frick
(74) *Attorney, Agent, or Firm* — Hemisphere Law, PLLC; Zhigang Ma

(57) ABSTRACT

A self-balancing scooter and a main frame assembly thereof are provided. The self-balancing scooter includes a first main frame and a cooperated second main frame. The first main frame includes a first connecting portion, the first connecting portion includes a first end surface, the first end surface defines a guide hole, and the guide hole is positioned between a center and an edge of the first end surface. The second main frame includes a second connecting portion, the second connecting portion includes a second end surface corresponding to the first end surface of the first connecting portion, the second end surface defines a conduit, the conduit is positioned between a center and an edge of the second end surface, the conduit is accommodated in the guide hole, and the first connecting portion is assembled and connected to the second connecting portion.

9 Claims, 5 Drawing Sheets

(56) References Cited

U.S. PATENT DOCUMENTS

| | | | | |
|---|---|---|---|---|
| 4,590,961 | A * | 5/1986 | Schumann | F16G 13/16 137/355.16 |
| 4,625,507 | A * | 12/1986 | Moritz | H02G 11/006 59/78.1 |
| 7,708,239 | B2 * | 5/2010 | Watanabe | F16M 11/08 248/125.7 |
| 7,954,777 | B2 * | 6/2011 | Bohm | H01Q 1/1221 248/278.1 |
| 8,408,565 | B2 * | 4/2013 | An | A63C 17/016 280/87.05 |
| 8,453,424 | B2 * | 6/2013 | Jostmeier | F16G 13/16 59/78.1 |
| 8,579,656 | B2 * | 11/2013 | Huang | H01R 35/04 439/518 |
| 9,376,155 | B2 * | 6/2016 | Ying | B62K 11/007 |
| 9,840,302 | B2 * | 12/2017 | Zeng | B60K 1/04 |
| 10,139,615 | B2 * | 11/2018 | Heinrich | G02B 23/16 |
| 10,144,477 | B2 * | 12/2018 | Lankford | B62K 3/002 |
| 10,167,037 | B2 * | 1/2019 | Ying | B62D 51/02 |
| 10,207,764 | B2 * | 2/2019 | Li | B62J 99/00 |
| 10,293,879 | B1 * | 5/2019 | Killing | B62K 19/32 |
| 10,328,987 | B2 * | 6/2019 | Dai | B62K 11/007 |
| 10,421,006 | B1 * | 9/2019 | Li | A63C 17/0093 |
| 10,538,286 | B2 * | 1/2020 | Ying | B62K 11/00 |
| 2012/0091677 | A1 * | 4/2012 | Wu | A63C 17/016 280/87.042 |
| 2013/0238231 | A1 * | 9/2013 | Chen | B62K 11/007 701/124 |
| 2018/0037293 | A1 * | 2/2018 | Chen | B62M 7/12 |
| 2019/0031269 | A1 * | 1/2019 | Shang | B62K 19/40 |
| 2019/0077479 | A1 * | 3/2019 | Chen | B62K 11/007 |
| 2019/0193803 | A1 * | 6/2019 | Desberg | B62K 11/007 |
| 2019/0382065 | A1 * | 12/2019 | Shang | B62J 6/00 |

* cited by examiner

SELF-BALANCING SCOOTER AND MAIN FRAME ASSEMBLY THEREOF

FIELD OF THE DISCLOSURE

The disclosure relates to the field of scooter technologies, and more particularly to a self-balancing scooter and a main frame assembly thereof.

BACKGROUND

A self-balancing scooter, is also named as hoverboard or self-balancing board. A working principle of the self-balancing scooter is mainly based on a basic principle called "dynamic stability", which uses a gyroscope and an acceleration sensor inside a scooter body to judge a posture state of the scooter body through a precision and high-speed central microprocessor. After calculating appropriate instructions, drive a motor to achieve a balanced effect.

The self-balancing scooter usually includes two connected main frames, a driving battery, a control circuit board, two hub motors, and two wheels, etc. The two main frames are configured to form a pair of articulated pads on which a rider places theft feet. The driving battery is usually installed at a bottom end of one of the main frames, and the control circuit board is usually installed at a bottom end of the other main frame. The hub motors are respectively located inside the wheels, and the wheels are mounted at outer ends of the above-mentioned connected main frames. Since an electrical connection is required between the driving battery and the control circuit board, an electrical connection is also required between the control circuit board and the two hub motors, wires for performing the electrical connection need to pass between the two main frames.

The two main frames are generally connected by a connecting shaft. To facilitate the passage of the wires, the connecting shaft is generally a hollow tube, so that the wires can pass through the through hole in the connecting shaft. Due to a generally cylindrical shape of a main body of the connecting shaft, during an operation of the self-balancing scooter, with a slight swing of the main frame, the connecting shaft usually generates continuous rotation. It may cause the wires located therein to rotate at the same time, and it is possible to cause the wires to twist together and eventually break.

SUMMARY

On such basis, it is necessary to provide a self-balancing scooter and a main frame assembly thereof. The self-balancing scooter is provided with a special wire channel to facilitate the passage of the wires and prevent the wires from being damaged.

In an embodiment, the disclosure provides a self-balancing scooter. The self-balancing scooter includes a first main frame and a cooperated second main frame. The first main frame includes a first connecting portion, the first connecting portion includes a first end surface, the first end surface defines a guide hole, and the guide hole is positioned between a center and an edge of the first end surface. The second main frame includes a second connecting portion, the second connecting portion includes a second end surface corresponding to the first end surface of the first connecting portion, the second end surface defines a conduit, the conduit is positioned between a center and an edge of the second end surface, the conduit is accommodated in the guide hole, and the first connecting portion is assembled and connected to the second connecting portion.

In an embodiment, the self-balancing scooter further includes a connecting shaft, the first end surface is provided with a first connecting hole and the second end surface is provided with a second connecting hole, and the connecting shaft extends through the first connecting hole and the second connecting hole to connect the first connecting portion and the second connecting portion.

In an embodiment, each of a cross-section of the conduit at the second connection portion and a cross-section of the guide hole at the first connecting portion is an annulus, and a center of the annulus is located on an axis of the connecting shaft.

In an embodiment, a central angle range of two concentric arcs respectively at left and right sides of the cross-section of the conduit at the second connecting portion is 5~45 degrees, and another central angle range of two concentric arcs respectively at left and right sides of the cross-section of the guide hole at the first connecting portion is 6~90 degrees.

In an embodiment, the first end surface of the first connecting portion further defines a second conduit, and the second conduit is positioned between the center and the edge of the first end surface; the second end surface of the second connecting portion further defines a second guide hole, the second guide hole is positioned between the center and the edge of the second end surface; the second conduit is accommodated in the second guide hole when the first connecting portion is assembled and connected to the second connecting portion.

In an embodiment, a distance between the first end surface and the second end surface is 0.5 millimeters to 8 millimeters, when the first connecting portion is assembled and connected to the second connecting portion.

In an embodiment, an axis of the conduit is perpendicular to the second end surface.

In another embodiment, a main frame assembly of a self-balancing scooter is provided. The main frame assembly includes a first main frame and a cooperated second main frame. The first main frame includes a first connecting portion, the first connecting portion includes a first end surface, the first end surface defines a guide hole, and the guide hole is positioned between a center and an edge of the first end surface. The second main frame includes a second connecting portion, the second connecting portion includes a second end surface corresponding to the first end surface of the first connecting portion, the second end surface defines a conduit, the conduit is positioned between a center and an edge of the second end surface, the conduit is accommodated in the guide hole, and the first connecting portion is assembled and connected to the second connecting portion.

In an embodiment, the self-balancing scooter further comprises a connecting shaft, the first end surface is provided with a first connecting hole and the second end surface is provided with a second connecting hole, and the connecting shaft extends through the first connecting hole and the second connecting hole to connect the first connecting portion and the second connecting portion.

In an embodiment, each of a cross-section of the conduit at the second connection portion and a cross-section of the guide hole at the first connecting portion is an annulus, and a center of the annulus is located on an axis of the connecting shaft.

In still another embodiment, a self-balancing scooter is provided. The self-balancing scooter includes a first main frame, a second main frame, and a connecting shaft. The first main frame includes a first connecting portion, the first connecting portion includes a first end surface, a first guide hole, and a first connecting hole, an axis of the first guide hole and an axis of the first connecting hole are individually perpendicular to the first end surface, the first connecting hole extends through a central position of the first end surface. The second main frame includes a second connecting portion, the second connecting portion includes a second end surface, a first conduit, and a second connecting hole, an axis of the first conduit and an axis of the second connecting hole are individually perpendicular to the second end surface, the second end surface is parallel to the first end surface, the second connecting hole extends through a central position of the second end surface and is aligned with the first connecting hole. The connecting shaft extends through the first and the second connecting holes thereby assembling and connecting the first and the second main frames together. In such a state, a distance between the first and the second end surfaces is 0.5 millimeters to 8 millimeters, the first conduit is accommodated in the first guide hole and matches the first guide hole in such a manner that the first conduit is limited to rotate 0 to 20 degrees relative to the first guide hole.

In an embodiment, the first connecting portion further defines a second conduit, and the first guide hole and the second conduit are positioned respectively at two opposite sides of the first connecting hole.

In an embodiment, the second connecting portion further defines a second guiding hole, and the second conduit is accommodated in the second guide hole when the first connecting portion is assembled and connected to the second connecting portion.

In an embodiment, the second conduit matches the second guide hole in such a manner that the second conduit is limited to rotate 0 to 20 degrees relative to the second guide hole.

In an embodiment, a stiffener is provided on a hole wall of the first connecting hole.

In an embodiment, the cross-section of the first guide hole at the first end surface comprises a first arc, a second semicircle, a third arc, and a fourth semicircle that are sequentially connected in that order.

In an embodiment, the center of the first arc coincides with the center of the third arc, and the center is located at the axis of the first connecting hole.

In an embodiment, the connecting shaft comprises a screw, at least one spacer, at least one sleeve, and at least one nut.

In an embodiment, a diameter of the first connecting hole is equal to that of the second connecting hole, and a diameter of the screw is matched with that of the second connecting hole.

In an embodiment, the diameter of the second connecting hole is in the range of 8 millimeters to 30 millimeters.

The embodiments of the disclosure may have the following advantages. According to the above self-balancing scooter, a guide hole and a conduit are provided, and the wires can be arranged in the conduit. Therefore, the function of passing wires in the connecting shaft can be eliminated, and the connecting shaft can be designed to be solid. As such, with the same cross-sectional area of the connecting shaft, the strength of the solid connecting shaft is higher, and the bearing capacity of the entire self-balancing scooter is enhanced. In addition, by providing arc-shaped guide hole and conduit, when the two main frames are connected, they also have the effect of facilitating the wires and protecting the wires from being damaged due to rotation of the connecting shaft. By arranging the conduit and the guide hole, when the two main frames are connected, the alignment between the two main frames can be more conveniently achieved, and then the two main frames can be connected using the connecting shaft.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

Figure 1:
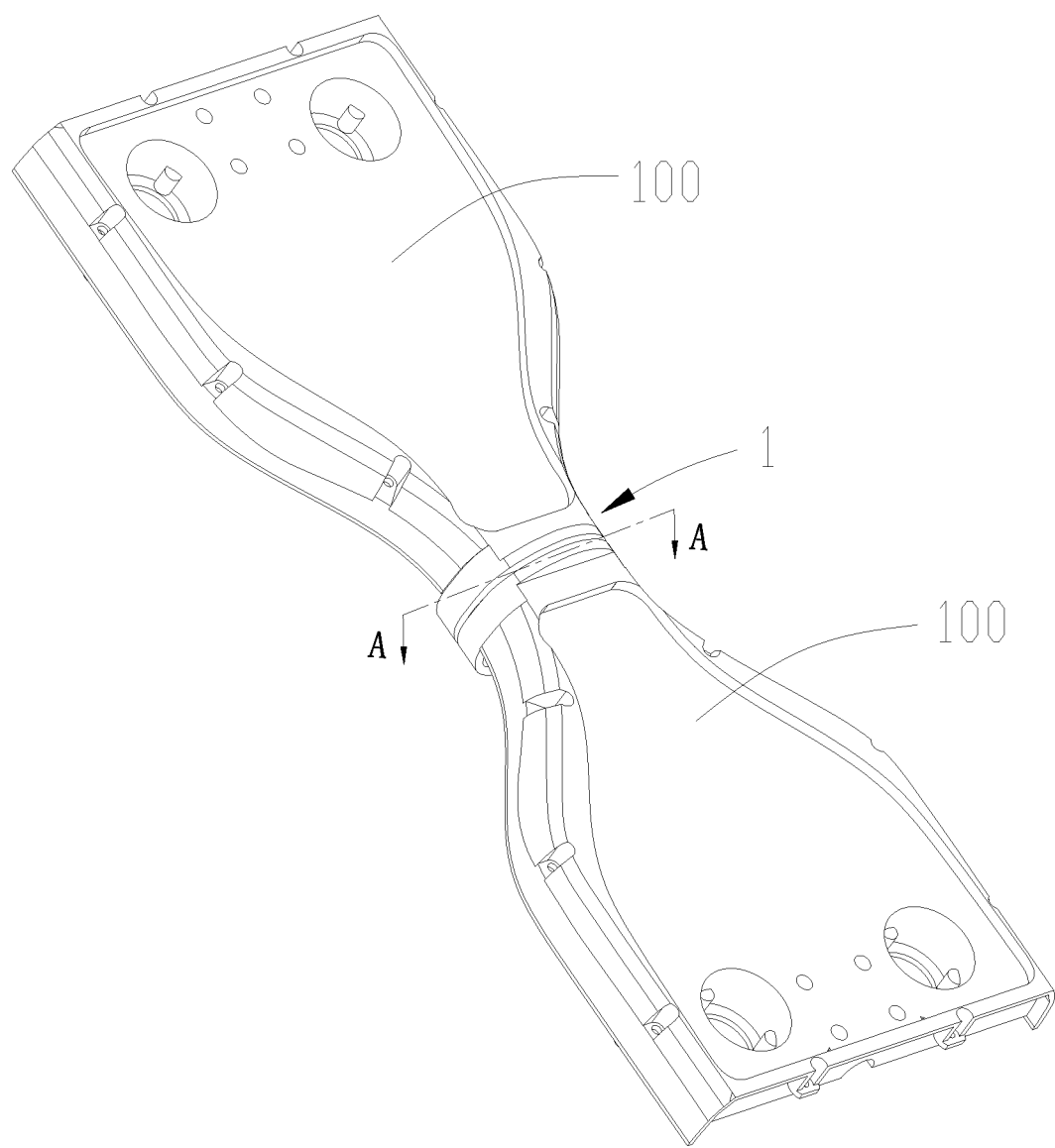
FIG. 1 is a schematic structural view of a self-balancing scooter including two main frames connected and assembled together, according to an embodiment of the disclosure.

Description of reference numerals: 100—main frame, 1—connecting portion, 11—columnar body, 12—connecting hole, 13—guide hole, 14—conduit, 140—conduit hole, 15—hole wall, 16—stiffener, 17—end surface, 18—wires, 2—connecting shaft, 21—screw, 22—spacer, 23—sleeve, 24—nut

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise/includes" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

As described above, in the prior art, the two main frames of the self-balancing scooter are usually connected through a hollow tubular connecting shaft, which both serves the purpose of mechanically connecting the main frames and achieving the electrical connection. When the self-balancing scooter is in operation, the connecting shaft usually rotates, and then the inner wires rotate simultaneously, it may cause the wires to twist together and eventually break.

To solve the above technical problem, as shown in FIG. 1 to FIG. 7, an embodiment of the disclosure provides a self-balancing scooter. The self-balancing scooter includes two main frames 100 and a wire passage device. The wire passage device is disposed between the two main frames 100, that is, positioned at end portions of the main frame 100. The wire passage device mainly includes two connecting portions 1 and a connecting shaft 2. The self-balancing scooter in the embodiment of the disclosure will be described in detail with reference to accompanying drawings as follows.

Figure 2:
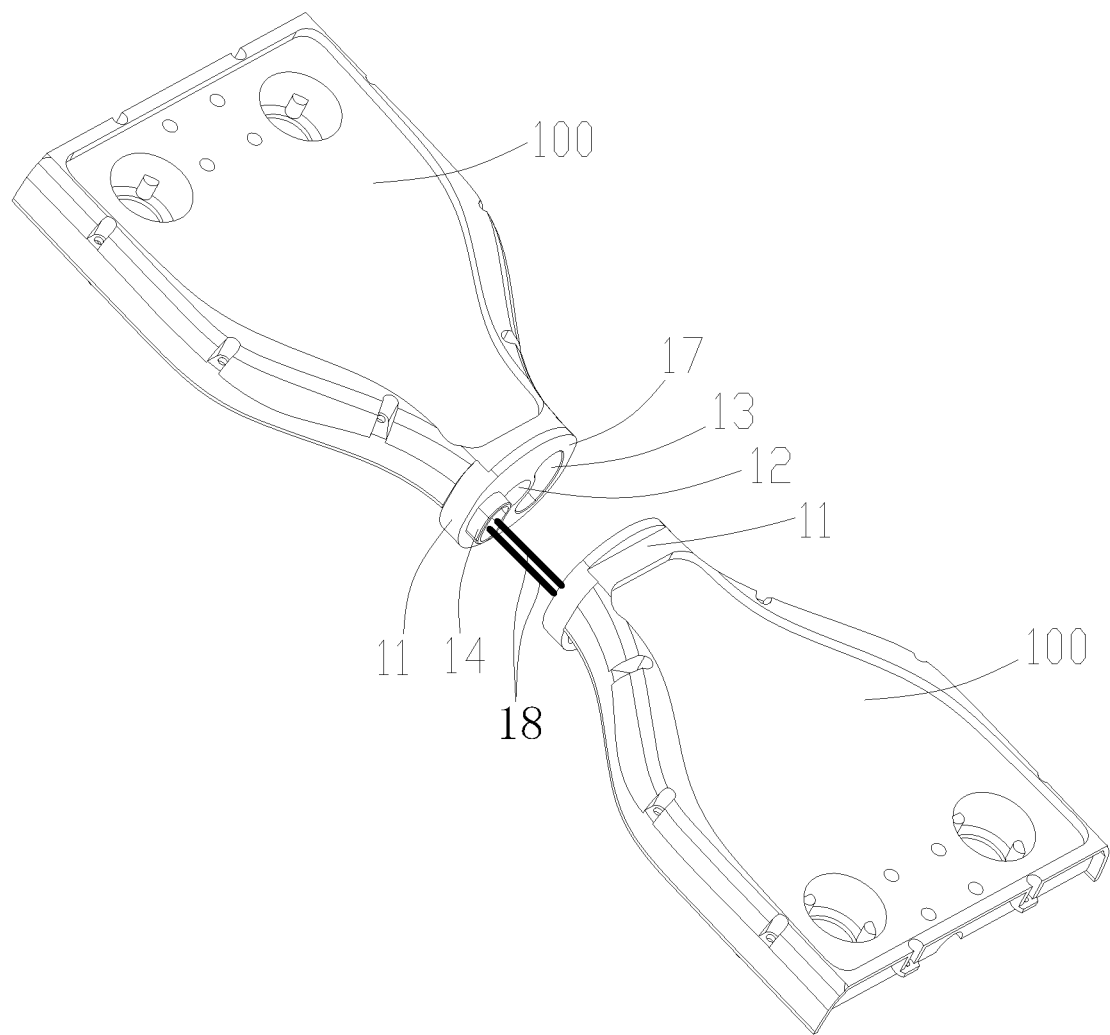
FIG. 2 is a schematic structural view of the two main frames of FIG. 1 in separated state.

As shown in FIG. 1 and FIG. 2, the self-balancing scooter includes two main frames 100, which has a substantially plate shape, are configured to form a pair of articulated pads on which a rider places feet thereof. For the main frames 100, the outer ends thereof, i.e., two opposite ends of the two main frames 100 as shown in FIG. 1, each can be used to install a wheel (not shown). The main frames 100 each define a connection portion 1 at an intermediate position between the two main frames 100, to facilitate the connection and installation between the two main frames 100. In practical applications, a balance control device, a gyroscope, a control sub-board, wheels, a main board, and the like are also mounted on the main frames 100 of the self-balancing scooter. The illustrated embodiment just shows the structure related to the connection of the main frames, and the other structures have been omitted. It is believed that people skilled in the art understand and are familiar with those omitted structures.

Figure 3:
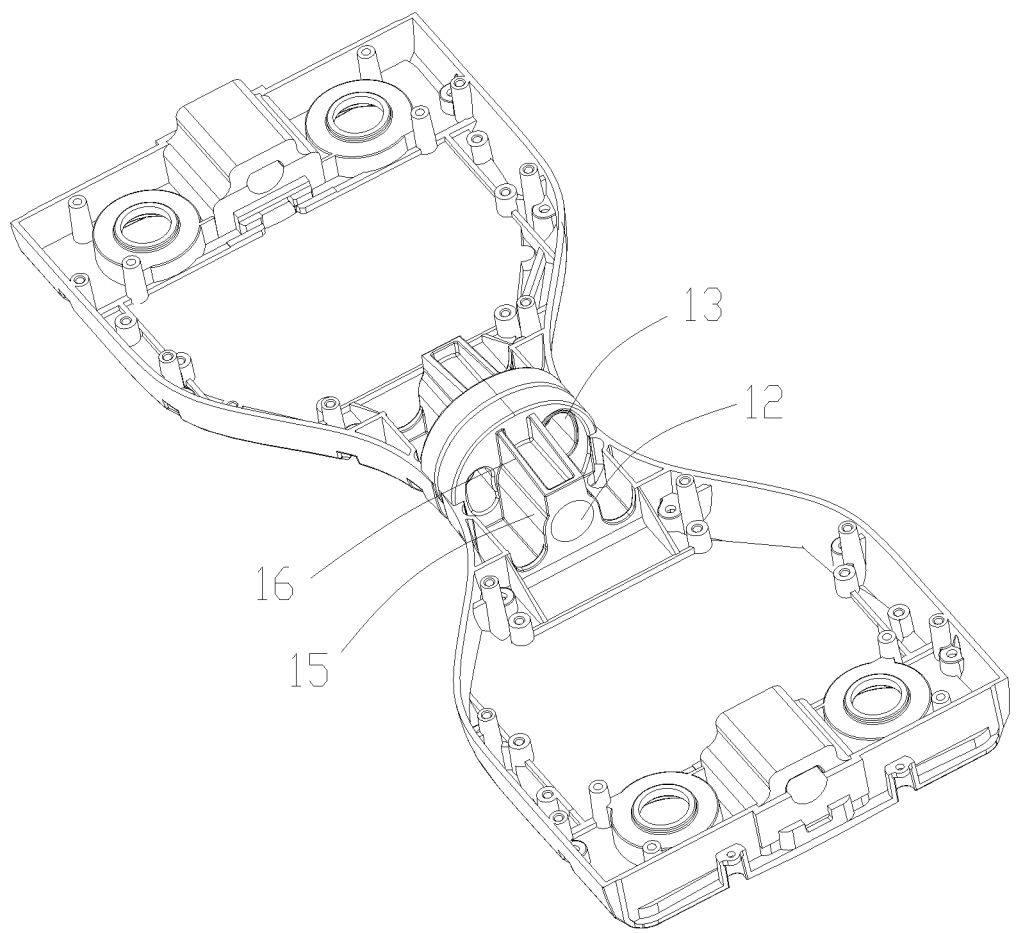
FIG. 3 is a schematic rear view of the main frame of FIG. 1.

From the front schematic view of the main frame of FIG. 2, and the rear schematic view of the main frame of FIG. 3, it can be found out that the connection portion 1 mainly includes two parts, one part is a substantially regular structure like a columnar body 11, and the other part is an irregular supporting structure closely attached to the columnar body 11. The columnar body 11 has a cylindrical shape with a circular cross-section. In the columnar body 11, a connecting hole 12 is defined along a direction perpendicular to the circular cross-section. The connecting hole 12 is located approximately at the center of the columnar body 11. The connection portion 1 further defines a hole wall 15 extends from the columnar body 11 along the lengthwise direction of the connecting hole 12. The upper end of the hole wall 15 is provided with a stiffener 16, and the stiffener 16 mechanically connects the columnar body 11 and the hole wall 15 to reinforce the strength of the connecting portion 1 while reducing the weight of the connecting portion 1.

Figure 4:
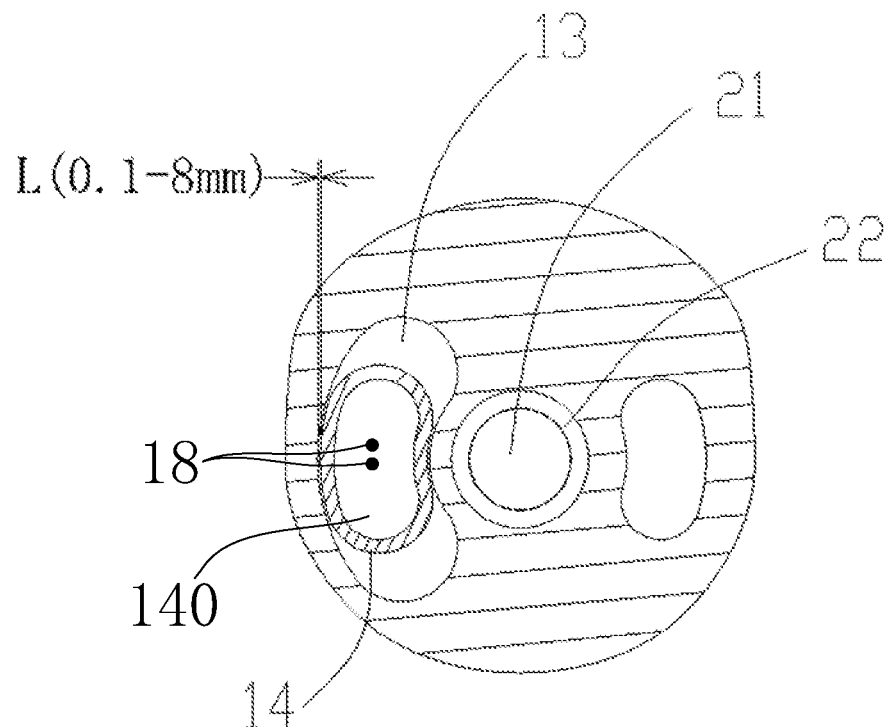
FIG. 4 is a cross-sectional schematic view taken along arrow A-A direction of the self-balancing scooter of FIG. 1.
Figure 5:
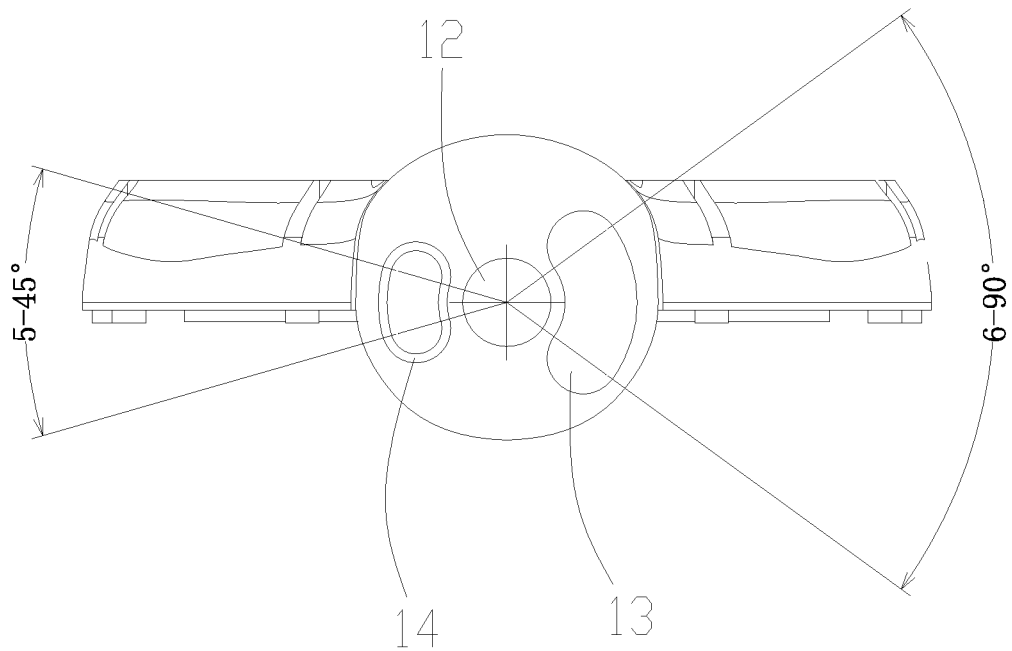
FIG. 5 is a schematic view of an end surface of the main frame of FIG. 1.

As shown in FIG. 2, FIG. 4, and FIG. 5, a conduit 14 is disposed at the connecting portion 1 of one of the main frames 100. Specifically, the conduit 14 is disposed on an end surface 17 of the columnar body 11, and a conduit hole 140 inside the conduit 14 extends and passes through the columnar body 11. Meanwhile, the other main frame 100 defines a guide hole 13 at a corresponding position. When the two main frames 100 are assembled and connected together, the conduit 14 is located in the guide hole 13, and the conduit hole 140 of the conduit 14 extends through the columnar body 11. The cross-section area of the conduit hole 140 of the conduit 14 is larger than the cross-section area of a connector installed at the end of the wires 18, so that the wires 18 and the connector can be smoothly passed through the conduit hole 140 of the conduit 14, and thereby achieving the function of convenient alignment.

In the illustrated embodiment, the two main frames 100 each are provided with the guide hole 13 and the conduit 14, and the guide hole 13 and the conduit 14 are substantially symmetrically disposed at both sides of the connecting hole 12. When the two main frames 100 are mounted together, the conduit 14 is located in the corresponding guide hole 13, and the position of the conduit 14 and the guide hole 13 on one main frame 100 and the position of the conduit 14 and the guide hole 13 on the other main frame 100 are symmetrical with respect to the axis of the connecting shaft 2 described later. Of course, the number and structure of the guide hole 13 and the conduit 14 are not limited thereto. In other embodiments, just one guide hole 13 may be disposed on one main frame 100, and one corresponding conduit 14 is disposed on the other main frame 100; or two guide holes 13 are provided at one main frame 100, and two conduits 14 are provided at the other main frame 100. The guide hole 13 and the conduit 14 may also be of other shapes, numbers, and positions. For example, the shape is circular, the number is three, and may be distributed around the connecting hole 12 like a triangle. It is just necessary to satisfy that the guide hole 13 is larger than the conduit 14 and does not block the rotation of the two main frames 100 within a limited rotation angle.

As shown in FIG. 4 and FIG. 5, the cross-section of the guide hole 13 in the connecting portion 1 is substantially similar to a portion of annulus, it is a generally regular closed graph that can be constituted by multiple connected circular arcs. The cross-section of the conduit 14 in the connecting portion 1 also is substantially similar to a portion of annulus, it is a generally regular closed graph that can be connected by multiple circular arcs. Specifically, in the direction as shown in FIG. 4, the left and right sides of the cross-section of the conduit 14 are composed of two arcs with the same center, i.e., two concentric arcs, and the upper and lower sides thereof are composed of two semicircles. The central angle of the arc may be 5 to 45°, preferably 15 to 25°, and the center of the arc is located on the axis of the connecting hole 12.

Similarly, according to the direction shown in FIG. 4, the left and right sides of the cross-section of the guide hole 13 are composed of two arcs with the same center, i.e., two concentric arcs, and the upper and lower sides thereof are composed of two semicircles. The central angle of the above two concentric arcs may be 6~90°, preferably 28~60°, and the center of the arcs is located on the axis of the connecting hole 12. It is necessary to ensure that the central angle of the arc of the cross-section of the conduit 14 is smaller than that of the guide hole 13.

From the above, it can be gotten that the center of the arc constituted the cross-section of the guide hole 13 is located on the axis of the connecting hole 12, and the center of the arc constituted the cross-section of the conduit 14 is located on the axis of the connecting hole 12, and of course, the connecting hole 12 is coaxial with the connecting shaft 2 described later. In the direction of arc, the arc length of the cross-section of the conduit 14 is smaller than that of the guide hole 13. With this design, when the two main frames 100 are mounted together, the twist angles of the two main frames 100 can be limited. In this embodiment, the limited twist angles of the two main frames 100 may be limited to 20°, that is, the twist angle between the two main frames 100 ranges from 0 to 20°.

The above description mainly describes the specific structure of the connecting portion 1 at the end position of the main frame 100. In the following, the mechanical connection of the two main frames 100 will be described.

Figure 6:
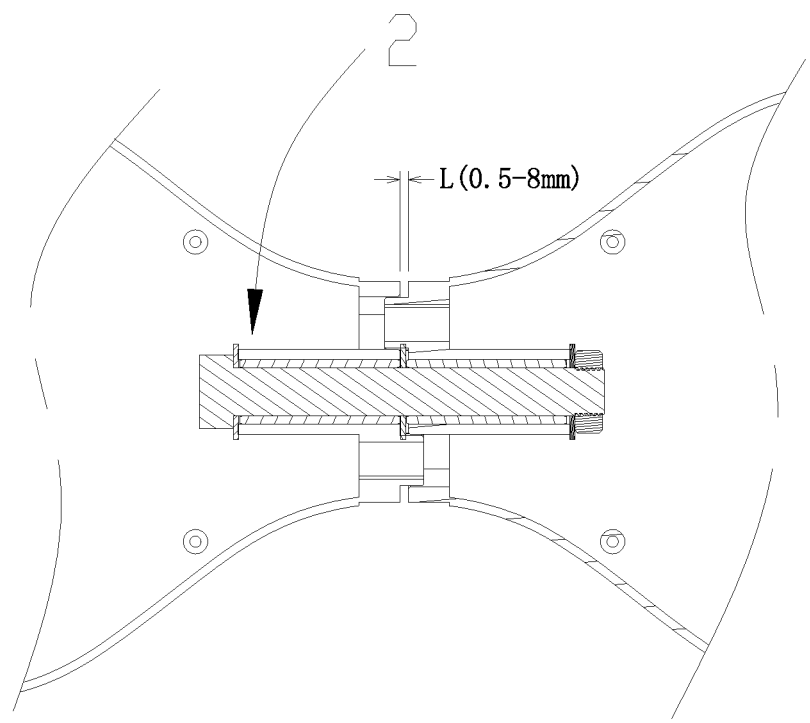
FIG. 6 is a cross-sectional schematic view of a connection shaft of the self-balancing scooter according to an embodiment of the disclosure.
Figure 7:
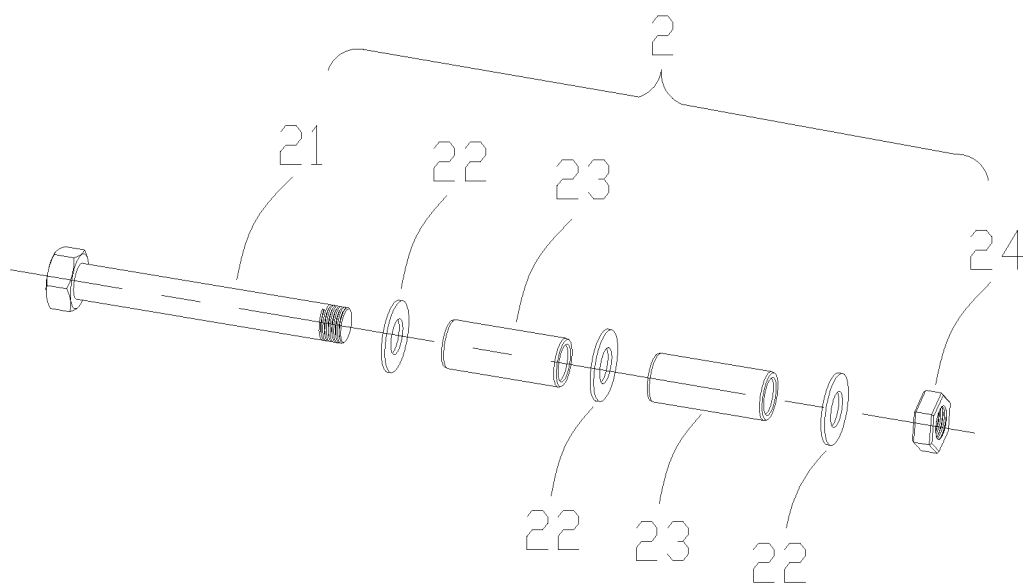
FIG. 7 is an exploded schematic view of the connecting shaft of the self-balancing scooter according to an embodiment of the disclosure.

As shown in FIG. 6 and FIG. 7, in an embodiment of the disclosure, two main frames 100 may be connected and assembled together by the connecting shaft 2. The connecting shaft 2 mainly includes at least one screw 21, at least one spacer 22, at least one sleeve 23, and at least one nut 24. The number of the at least one spacer 22 is three, the number of the at least one sleeve 23 is two, and both of the numbers of the screw 21 and the nut 24 are one.

When the main frames 100 are specifically assembled and connected, the shaft sleeve 23 and the spacer 22 are sleeved on the screw 21, pass through the connecting holes 12 of the two main frames 100, and then the nut 24 is finally screwed on the end of the screw 21, thereby achieving the connection of the two main frames 100.

In the embodiment, the diameter of the screw 21 is matched with the diameter of the sleeve 23, and the diameter of the sleeve 23 is matched with the diameter of the connecting hole 12. The screw 21 may be a solid body or a hollow body. The diameter of the connecting hole 12 can be in the range of 8 mm-30 mm.

In addition, referring back to FIG. 2, the end surface 17 is provided on the connecting portion of each the main frame 100. When the two main frames 100 are assembled and connected together, the distance between the end surfaces 17 of the two connecting portions 1 is 0.5 mm to 8 mm. In addition, the conduit 14 may be disposed perpendicular to the end surface 17, and the connecting shaft 2 extends perpendicular to the end surface 17.

In the self-balancing scooter provided by the embodiment of the disclosure, the guide hole 13 and the conduit 14 are disposed at the end of the main frame 100 to facilitate the wires 18 to pass through the interior of the conduit 14. The conduit 14 and the guide hole 13 just slightly oscillate during the work of the self-balancing scooter, and will not rotate relative to each other, thereby preventing the internal wires 18 in the conduit 14 from twisting and breaking and further preventing the wires 18 from being damaged. In addition, by arranging the conduits 14 and the guide holes 13, when the two main frames 100 are connected and assembled together, the alignment between the two main frames 100 can be more conveniently performed, and then the two main frames 100 can be easily connected using the connecting shaft 2. Finally, the arc length of the cross-section of the conduit 14 in the direction of the arc is smaller than the arc length of the cross-section of the guide hole 13 in the direction of the arc, it plays the role of limiting the twist angle of the main frame 100.

In another way, the self-balancing scooter in an embodiment of the disclosure includes a first main frame, a second main frame, and a connecting shaft 2. The first main frame includes a first connecting portion, the first connecting portion includes a first end surface, a first guide hole, a second conduit, and a first connecting hole. Axes of the first guide hole, the second conduit and the first connecting hole are individually perpendicular to the first end surface, the first connecting hole extends through a central position of the first end surface, and the first guide hole and the second conduit are both positioned between a center and an edge of the first end surface. The second main frame includes a second connecting portion, the second connecting portion includes a second end surface, a first conduit, a second guide hole, and a second connecting hole. Axes of the first conduit, the second guide hole and the second connecting hole are individually perpendicular to the second end surface. The first end surface is parallel to the second end surface. The second connecting hole extends through a central position of the second end surface and is aligned with the first connecting hole. The first conduit and the second guide hole are both positioned between a center and an edge of the second end surface. The connecting shaft 2 extends through the first and the second connecting holes thereby assembling and connecting the first and the second main frames together. In such a state, a distance between the first and the second end surfaces is 0.5 millimeters to 8 millimeters, the first conduit is accommodated in the first guide hole and matches the first guide hole in such a manner that the first conduit is limited to rotate 0 to 20 degrees relative to the first guide hole. The second conduit matches the second guide hole in such a manner that the second conduit is limited to rotate 0 to 20 degrees relative to the second guide hole. The cross-section of the first guide hole at the first end surface comprises a first arc, a second semicircle, a third arc, and a fourth semicircle that are sequentially connected in that order. The center of the first arc coincides with the center of the third arc, and the center is located at the axis of the first connecting hole. The cross-section of the first conduit has a similar shape to that of the first guide hole, but with a shorter arc length and a smaller semicircle.

In addition, it can be understood that the use of the connecting shaft 2 can also be omitted when the mating structure between the guide hole 13 and the conduit 14 has sufficiently strength.

The foregoing contents are detailed description of the disclosure in conjunction with specific preferred embodiments and concrete embodiments of the disclosure are not limited to this description. For the person skilled in the art of the disclosure, without departing from the concept of the disclosure, simple deductions or substitutions can be made and should be included in the protection scope of the application.

What is claimed is:

1. A self-balancing scooter comprising:

a first main frame, wherein the first main frame comprises a first connecting portion, the first connecting portion comprises a first end surface, the first end surface is formed with a first guide hole and a second conduit spaced from each other, and the first guide hole and the second conduit both are located between a center and an edge of the first end surface; and a second main frame, wherein the second main frame comprises a second connecting portion, the second connecting portion comprises a second end surface corresponding to the first end surface of the first connecting portion, the second end surface is formed with a first conduit and a second guide hole spaced from each other, the first conduit and the second guide hole both are located between a center and an edge of the second end surface, the first conduit is accommodated in the first guide hole, the second conduit is accommodated in the second guide hole, and the first connecting portion is connected with the second connecting portion; and wires, arranged in a conduit hole inside the first conduit and passing through both the first conduit and the first guide hole for electrical connection.

2. The self-balancing scooter according to claim 1, wherein each of a cross-section of the first conduit at the second connection portion and a cross-section of the first guide hole at the first connecting portion is an annulus, a central angle range of two concentric arcs at left and right sides respectively of the cross-section of the first conduit at the second connecting portion is 5~45 degrees, and another central angle range of two concentric arcs at left and right sides respectively of the cross-section of the first guide hole at the first connecting portion is 6~90 degrees.

3. The self-balancing scooter according to claim 1, wherein a distance between the first end surface and the second end surface is 0.5 millimeters to 8 millimeters when the first connecting portion is connected with the second connecting portion.

4. The self-balancing scooter according to claim 1, wherein an axis of the first conduit is perpendicular to the second end surface.

5. The self-balancing scooter according to claim 1, wherein the first conduit matches the first guide hole in such a manner that the first conduit is limited to rotate 0 to 20 degrees relative to the first guide hole.

6. The self-balancing scooter according to claim 1, wherein a cross-section of the first guide hole at the first end surface comprises a first arc, a second semicircle, a third arc, and a fourth semicircle that are sequentially connected in that order.

7. The self-balancing scooter according to claim 6, wherein the first arc and the third arc are concentric arcs.

8. The self-balancing scooter according to claim 1, wherein a central angle range of two concentric arcs at left and right sides of a cross-section of the first conduit at the second connecting portion is smaller than another central angle range of two concentric arcs at left and right sides of a cross-section of the first guide hole at the first connecting portion, arc lengths of the two concentric arcs at the left and right sides of the cross-section of the first conduit are respectively smaller than corresponding ones of arc lengths of the two concentric arcs at the left and right sides of the cross-section of the first guide hole and thereby a twist angle between the first main frame and the second main frame is limited.

9. The self-balancing scooter according to claim 1, wherein the first end surface further is formed with a third conduit, the second end surface further is formed with a third guide hole, and the third conduit is accommodated in the third guide hole; the first guide hole, the second conduit and the third conduit are located between the center and the edge of the first end surface in a triangular manner.

* * * * *